(No Model.)
F. SALATHE.
VARNISH AND METHOD OF PRODUCING SAME.
No. 547,295. Patented Oct. 1, 1895.
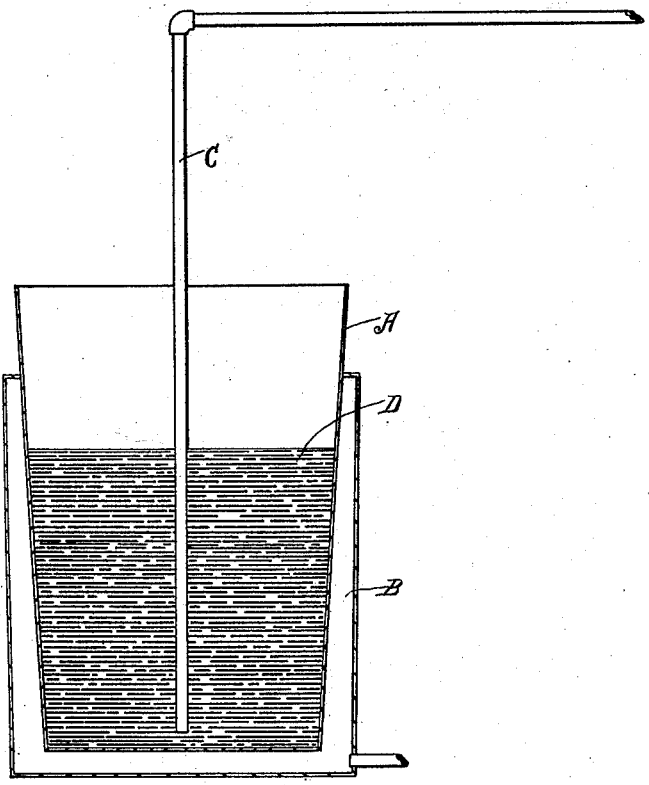

UNITED STATES PATENT OFFICE.

FREDERICK SALATHE, OF SANTA PAULA, CALIFORNIA, ASSIGNOR TO THE UNION OIL COMPANY OF CALIFORNIA, OF SAME PLACE.

VARNISH AND METHOD OF PRODUCING SAME.

SPECIFICATION forming part of Letters Patent No. 547,295, dated October 1, 1895.

Application filed February 19, 1894. Serial No. 500,716. (No specimens.)

*To all whom it may concern:*

Be it known that I, FREDERICK SALATHE, a citizen of the United States, formerly a resident of Jersey City, New Jersey, and New York city, New York, now residing at Santa Paula, in the county of Ventura, State of California, have invented a new and useful Varnish, a Vehicle for Printing-Inks, and a Method of Producing the Same, of which the following is a specification.

My invention relates to the manufacture from bitumens of a varnish or vehicle for pigments which when combined with such pigments forms a printer's ink. It also includes said varnish or pigment vehicle.

The object of my invention is to produce and provide from bitumens a vehicle for such pigments which when combined with the pigments will form a printer's ink which will not penetrate the paper or leave a greasy stain or margin around the impression and which will not offset nor smear nor rub off nor have an offensive odor.

One special feature of my invention is that I am enabled to produce a printer's ink practically odorless.

Printers' inks have heretofore been made from varnishes or vehicles prepared from petroleums; but such inks have been objectionable in that the petroleum was not so susceptible of being oxidized as to avoid (when prepared in the manner heretofore known to the art) the objectionable penetration above mentioned and the offensive odor and the liability to offset, rub off, and smear. The oils heretofore used for such vehicles have been of the paraffine series, and when the same processes of preparation were applied to oils convertible into asphaltum an objectionable brownish tinge was found to be always present in the impression taken from such inks where a black pigment was used and a black impression was desired. This feature was found to be very objectionable with inks for paper and book work or any work where black ink was required. These objections caused the inks from this class of petroleum as produced by the processes heretofore known to be practically useless to meet the demands for rapid and fine presswork of the present day.

Another object of my invention therefore is to utilize for manufacturing printers' inks bitumens convertible into asphaltum. The petroleums which I have used are those obtained in Ventura county, California, and are convertible into asphaltum.

In order that my invention may be understood by those versed in the technology and chemistry of bitumens, I will first premise that the bitumens found in Southern California, particularly in Ventura county, are specifically different from those bitumens which are found east of the Mississippi river and known as "paraffine petroleums." The California bitumens when subjected to distillation produce distillates, which, as they flow from the still, are colorless or are of pale yellow or brown color, but which, after a few hours' standing, change in color to very much darker shades and range from the lightest through pale brown to black. The particular fraction or portion under consideration with relation to the subject-matter of this patent is when it first appears from the condenser of a pale-yellow color or almost colorless, and the same oil after standing for a few hours will become of a muddy black or dark-brown color, but when subjected to the ordinary process of treatment with acid and alkali familiar to every refiner of petroleums it becomes of a dark cherry-red color. After such treatment the oil may be kept for any length of time and its red color will remain as described until the oil is oxidized. In the present condition of research it is impossible for me to define the product which I herein claim as my invention further than by certain physical characteristics, which I will hereinafter set forth, and the further fact that it is the product resulting from the oxidation of said special fraction; but such definition is so clear and exact that any one versed in the art will readily distinguish the new product by said description.

The terms "asphalt" and "asphaltum" have loosely been used heretofore to designate various unlike substances, embracing, in addition to the solid forms of bitumen as they occur in nature, a variety of solid residuums resulting from the distillation of bitumens and unlike the asphaltum which is produced by natural causes. The various substances, which have thus been loosely termed "asphalt" or "asphaltum" are unlike each other and also collectively unlike the natural asphalts. The use of the words "asphaltum" and "asphalt" in this application for patent is to be understood to apply only to those bitumens which are included in the proper definition of the terms "asphalt" and "asphaltum"—viz., the solid forms of bitumen occurring in nature.

I have discovered that while petroleums of this character have been objectionable for the reasons above stated when properly prepared they are specially adapted for printers' inks, because such petroleums are far more susceptible of oxidation than petroleums of the paraffine series, and when such petroleum is properly treated and combined with the resin to form a vehicle or varnish it is far superior to any vehicle heretofore made from petroleums, because there is no tendency to penetrate the paper, the greasiness being wholly destroyed, and the consistency or body is such that it will not smear, offset, or rub off, as is the case with imperfectly oxidized inks.

My improved method of producing the base for pigments consists in distilling and separating from the distillate of bitumen convertible into asphaltum that portion or special fraction, which upon trial is found to be susceptible of oxidation, and which portion or fraction is found among the distillates (from such bitumen) having a specific gravity of from 22° to 25° Baumé, treating said fraction with the ordinary acid and alkali treatment, oxidizing such special fraction, substantially as hereinafter set forth, and dissolving in such treated oxidized special portion or fraction of the distillate a suitable amount of rosin or other vegetable resinous gums. The said distillates may be subjected to the oxidizing agents either before or after the addition of the rosin or resinous gums; but it is preferably oxidized before the gum is added, so that a larger quantity of the distillate may be subjected to the oxidizing agents at one time. The treated distillates are subjected to the oxidizing agents at a suitable temperature, not exceeding the flash-point of the oil treated.

My improved varnish consists in the composition of vegetable rosin or resinous gums and the treated and oxidized special fraction of the distillate obtained from bitumen convertible into asphaltum herein defined. This product is distinctively new in its chemical and physical qualities.

The practical fraction for use in making linolith can be separated on the first distillation of the crude oil; but it is preferable to do it on the redistillation of the first distillate. No designation can be made of the exact specific gravity of this distillate. It is a distillation obtained from oxidizable petroleums convertible into asphaltum that is found upon experiment to be susceptible of oxidation to such a degree as to serve the purpose. This can be determined at the end of the oxidizing by the very much increased viscosity of the oil and the change in color from dark cherry-red to black and the loss of transparency, except when the oil is spread very thin. As obtained from the oils produced in the neighborhood of Santa Paula, this distillate comes out below the so-called "26° gravity oil," at which the 28° gravity distillate is cut off and the lubricating distillates. It is after the acid and alkali treatment a dark-red oil, with a specific gravity of 24° Baumé. The specific gravity must not be limited to 24°, as with different crude petroleums, either lighter or heavier than the average now used at Santa Paula, this distillate suitable for this purpose might be either heavier or lighter than 24°. A distinguishing characteristic of this distillate for this purpose is its susceptibility to oxidation, thereby becoming more viscous, and the color changing from red to black and losing its transparency after a manner similar to the effect produced by boiling linseed-oil. It thickens. Practically, some of the distillates will not thicken at all; but this fraction will thicken and, under the action of the oxidizing agents, becomes somewhat of the consistency of thin varnish.

I will describe the production of this varnish as practically carried on by me.

In preparing the treated distillate for the preparation of my improved varnish eight barrels of the said distillate are put into a tank, provided with a steam-coil for heating, and with an air-injector, and heated to 210° Fahrenheit. A jet of air is then injected, which causes violent ebullition of the oil with rapid expulsion of the moisture within the oil, and as the oil becomes a little hotter (heated at 215° Fahrenheit) the air passing through appears to oxidize the oil and burn out a portion of the hydrogen, so that steam escapes from the surface. When the oil reaches a temperature of 215° Fahrenheit, binoxide of manganese is added in the proportion of two ounces to a barrel of oil and dry borate of manganese in the proportion of one-half an ounce to the barrel of oil. The borate of manganese is a very light powder and should be carefully rubbed with a portion of the oil until the mixture is smooth and then added in small portions at a time. The binoxide of manganese being heavier and in very fine powder is sifted into the oil. After these two substances are added to the oil the oil is agitated by a current of air from the injector for two hours, more or less. At the end of the operation the viscosity of the oil is greatly increased, the color changed from red to black, and it is no longer transparent.

On cooling, the small quantity of sediment resulting from the addition of the chemicals subsides and the oil is pumped off into a storage-tank.

The process just described and the product thus obtained are not the invention which I claim herein, being a separate invention for which I have made application, Serial No. 500,718, for Letters Patent of the United States, filed contemporaneous with this application.

The accompanying drawing illustrates apparatus suitable for carrying out the process of manufacturing my improved vehicle and varnish.

A indicates a tank provided with the steam-jacket B and with a live-steam injector C.

D indicates a charge of material to be treated.

A larger or smaller quantity of oil may be treated at a time, as may be found convenient. I store a considerable amount of the oxidized distillate before I proceed with the succeeding step of making the varnish. About four hundred gallons of this oxidized oil are then placed in the tank A, provided with a steam-jacket B and live-steam injector C. It is then first heated by means of the jacket with steam at a pressure of about fifty pounds to a temperature of 240° Fahrenheit. Live steam is then injected into the oil until the temperature reaches about 280° Fahrenheit, the heating of the oil requiring from five to six hours, more or less. Common rosin is then added in the proportion of thirteen hundred and fifty pounds of rosin to the four hundred gallons of oil, or three and three-eighths pounds per gallon between forty to forty-five per cent. of the oil by weight. The rosin is added a few shovelfuls at a time, live steam being kept on until the rosin and oil are completely melted and blended together. This occupies some four or five hours, and brings the process to the close of the first day. The mixture is then left with the live steam on, passing through it, during the night—about twelve hours (but three or four hours might be sufficent)—at a pressure of about fifty pounds, (if the pressure is less more time is required,) and in the morning the odors of both mineral oil and rosin have disappeared, the mixture being practically deodorized.

It is to be understood that while the above is a detailed account of the method preferably employed to form the varnish I do not limit my claim strictly to the details given.

The oxidation may be effected by means of any suitable oxidizing agents—such as a current of hot air alone if sufficient time is taken or by a current of hot air in the presence of any equivalent metallic oxides or peroxides—for example, the oxalate of manganese (a combination of oxalic acid) or other oxides of manganese (including also the peroxides) or the salts of chromic acid or the oxides or peroxide of lead or the peroxide of barium or sodium. All these act as oxidizing agents, giving off oxygen to the oil. Another agent which may be used is hydrogen peroxide. The oxidizing operation continues from two to six hours, according to the temperature and agents used. To accomplish the result by using a hot-air blast without other oxidizing agents, the operation would require from ten to twelve hours. The proportion of the oxidizing agents is from one one-hundredth of one per cent. to five per cent. of the oil by weight, the latter being the extreme quantity.

I have made three grades of varnish for colored inks, corresponding in consistency or tack and viscosity with the commercial grades of printer's-ink varnishes made from linseed-oil. I grade them 1, 2, and 3, and they vary from each other by the amount of rosin contained, which ranges from three to six pounds of rosin to the gallon of oil. The first grade has from about three to three and one-half pounds of rosin to the gallon; the second has from about four and one-half to five pounds of rosin to the gallon of oil, and the third has from about five and one-half to six pounds to the gallon of oil. The difference lies in the viscosity or tack required and in the varying power of keeping the mineral pigments in suspension. The first grade is used for light-weight pigments, while the other two grades are intended for heavier pigments. The amount of rosin in each grade is varied, as is customary with other varnishes, to adapt the varnish to the temperature at which it is to be used. The specific chemical composition of the fraction of the bitumen distillate suitable for this purpose has not yet been determined. The research necessary for this purpose requires more time than it has thus far been possible to devote to it. I have therefore referred to the characteristics of the oil as ascertained by an experimental determination of its fitness for the purpose, this being, in the event of more detailed knowledge concerning the fraction, the most rapid and practical method of determination. In consequence of the difficulty of assigning any elementary formula to linolith it has been defined by describing its constituents.

Now, having described my invention, what I claim as new, and desire to secure by Letters Patent, is—

1. The method set forth of producing a vehicle for pigments, which method consists as specified in distilling and separating from the distillate of bitumen convertible into asphaltum, that portion or special fraction, which upon trial, is found to be susceptible of oxidation, and which portion after the well-known acid and alkali treatment is a dark red oil having a specific gravity of about 24° Baumé (more or less) and found among those distillates having a specific gravity from 22° to 25° Baumé, the same under oxidation after treatment becoming more viscous and changing in color from red to black and losing its transparency after the manner similar to the effect produced by boiling linseed oil; treating said special fraction with acid and alkali; oxidizing such treated special fraction; combining with such treated and oxidized special fraction a suitable quantity of rosin or other vegetable resinous gums substantially as set forth.

2. The method set forth of producing a vehicle for pigments consisting as specified in distilling and separating from the distillates of bitumen convertible into asphaltum that portion or special fraction which upon trial, is found to be susceptible of oxidation and which portion after the well known acid and alkali treatment is a dark red oil having a specific gravity of about 24° Baumé more or less and found among those distillates having a specific gravity from 22° to 25° Baumé, the same under oxidation becoming more viscous and changing in color from red to black and losing its transparency after the manner similar to the effect produced by boiling linseed oil; treating said special fraction with acid and alkali; heating the treated distillate to about 210° Fahrenheit; injecting air into the treated oil thereby expelling the moisture within the oil, heating the oil to about 215° Fahrenheit then adding binoxide of manganese in the proportion of about two ounces to a barrel of oil, and dry borate of manganese in the proportion of about one-half an ounce to the barrel of oil; continuing the injection of air for two hours more or less until the viscosity of the oil is greatly increased and the color changed from red to black and the oil is no longer transparent.

3. The new article of manufacture consisting of the composition set forth of rosin or other vegetable resinous gums and the oxidized special fraction, of the distillate of bitumen convertible into asphaltum which fraction, upon trial, is found to be susceptible of oxidation, and which, after the well known acid and alkali treatment is a dark red oil having a specific gravity of about 24° Baumé and found among those distillates having a specific gravity from 22° to 25° Baumé the said fraction under oxidation becoming more viscous and changing in color from red to black and losing its transparency after the manner similar to the effect produced by boiling linseed oil.

FREDERICK SALATHE.

Witnesses:
STEPHEN F. PECKHAM,
JAMES R. TOWNSEND,
R. W. CLARK,
ALEX. WALDIE.